July 24, 1962

P. C. WILBUR ET AL

3,045,730

FRUIT PREPARATION MACHINE

Filed Jan. 7, 1958

FIG_9

FIG_10

INVENTORS
PAUL C. WILBUR
LESLIE VADAS
SYLVIO PUCCINELLI

BY Hans G. Hoffmeister

ATTORNEY

July 24, 1962 P. C. WILBUR ET AL 3,045,730
FRUIT PREPARATION MACHINE
Filed Jan. 7, 1958 11 Sheets-Sheet 10

FIG_21

INVENTORS
PAUL C. WILBUR
LESLIE VADAS
SYLVIO PUCCINELLI
BY Hans G. Hoffmeister
ATTORNEY INVENTORS
PAUL C. WILBUR
LESLIE VADAS
SYLVIO PUCCINELLI
BY Hans G. Hoffmeister
ATTORNEY United States Patent Office
3,045,730
Patented July 24, 1962

3,045,730
FRUIT PREPARATION MACHINE
Paul C. Wilbur, San Jose, Leslie Vadas, Los Gatos, and Sylvio Puccinelli, San Jose, Calif., assignors to FMC Corporation, a corporation of Delaware
Filed Jan. 7, 1958, Ser. No. 707,513
19 Claims. (Cl. 146—28)

This invention pertains to fruit preparation machines and more particularly to a method of pitting peaches and an apparatus for carrying out the method.

At present, in preparing peaches for canning, the pits are generally removed from the peaches by cutting each peach in half and then making a cut entirely around the pit half in each peach half. In this method of pitting peaches, a substantial portion of the flesh of the peach is wasted since the flesh adjacent the pit is severed from the rest of the peach and discarded with the pit.

An object of the present invention is to provide an improved method whereby peaches may be pitted with a minimum loss of the flesh of the peach.

Another object is to provide an improved fruit processing machine.

Another object is to provide an improved efficient pitting mechanism for a peach pitting machine.

Another object is to provide an improved mechanism for controlling and synchronizing the mechanisms of a pitting machine.

Other and further objects will become apparent from the following description taken in connection with the accompanying drawings, in which.

The peach pitting machine of the present invention comprises a peach feeding mechanism A (FIG. 1) which is adapted to receive peaches one at a time and deliver them rearwardly to a rotary peach transfer mechanism B. The transfer mechanism B (FIG. 2) removes the peaches from the feed mechanism, carries them across a saw C, and then upwardly and forwardly to a pitting head D where the pit half is removed from each peach half as the pitting unit carries the peach halves toward a discharge chute E.

Figure 2:
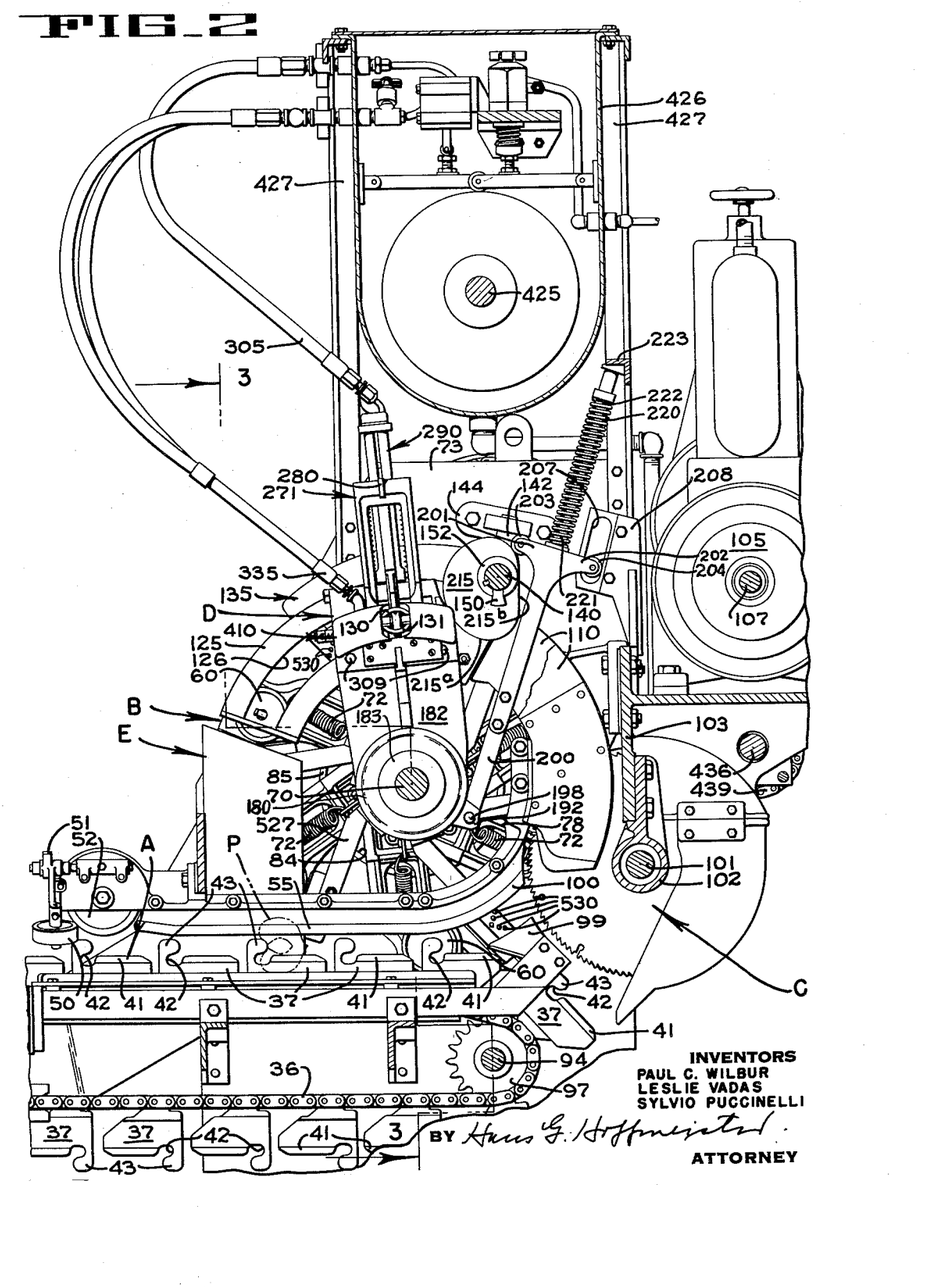
FIGURE 2 is an enlarged fragmentary vertical section taken along line 2—2 of FIG. 1.
Figure 3:
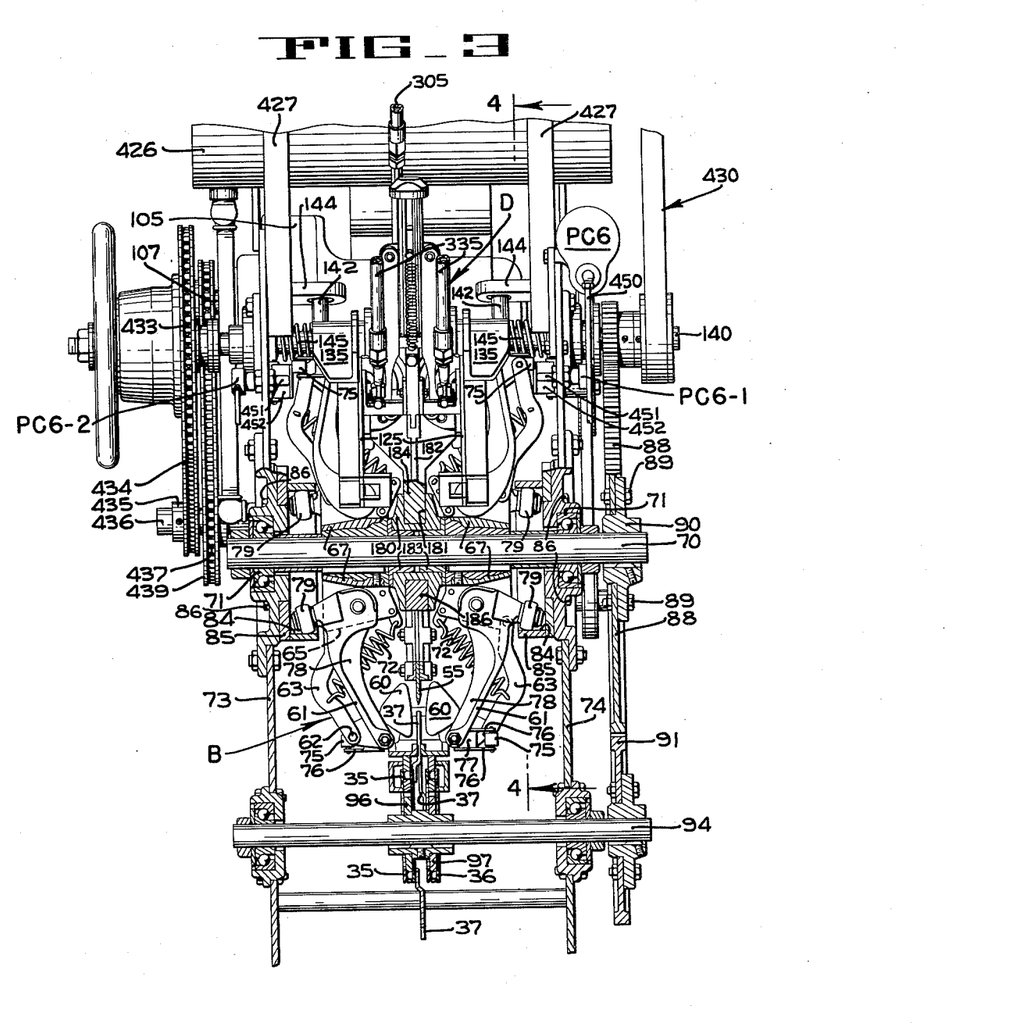
FIGURE 3 is a vertical section taken along line 3—3 of FIG. 2.

The peach feeding mechanism A includes a pair of endless chain conveyors 35 and 36 (FIG. 1), each of which carries a plurality of spaced blades 37 on which the peaches are impaled. The conveyors 35 and 36 diverge at their forward ends to provide spaced feed stations 39 and 40 near which operators stand as they impale peaches on the blades 37. As the conveyors move rearwardly they are guided into closely adjacent parallel positions so that the sharpened outer edge portions 41 of the blades 37, which are offset as seen in the lower portion of FIG. 3, are disposed in the same vertical plane. Each blade 37 has a recess 42 (FIG. 2) adjacent the sharpened upper edge 41, and a locating head or projection 43 adjacent the recess. The operator grasps the peach with both hands, adjusts the peach until its suture plane is vertical, and then holds the peach in a position such that the locating projection 43 of the blade enters the indentation at the stem end of the peach. When the projection 43 has entered the stem end of the peach the operator imparts a downward pivoting movement to the peach, causing the peach to be firmly impaled on the blade 37 with the longitudinal axis of the pit disposed in a substantially horizontal plane, as indicated in phantom lines in FIG. 2. As the peach is carried toward the transfer mechanism B it passes between a pair of pivotally mounted centering rollers 50 (FIG. 1) which are interconnected by meshing gear segments 51. A rotatable skin severing disc 52 (FIG. 2) is mounted in the vertical plane of the blades 37 immediately behind the centering rollers 50. The disc 52 cuts the flesh of the peach in the plane of the suture so that the peach can be moved onto an adjacent elongated stationary impaling blade 55 without any rotation of the peach taking place. As each peach is conveyed along the stationary blade 55, it is engaged by opposed cups 60 (FIGS. 2 and 3) of the transfer mechanism B.

The transfer mechanism B comprises a plurality of pairs of opposed cups 60, each cup being mounted on a rigid arm 61 (FIG. 3) that is pivotally connected by a bolt 62 to a cup-support arm 63. Each arm 63 is pivoted on a flange 65 that projects generally radially outwardly from a composite tubular support member 67 that is keyed to a shaft 70 journalled for rotation in bearings 71 disposed in side wall members 73 and 74 of the machine. A spring 72 is connected between the radial flange 65 and the cup-support arm 63 to normally urge the cup inwardly toward the path of movement of the impaling blades 37. A roller 75 is mounted for rotation on two short arms 76 carried by a bracket 77 that is secured, as by welding, to the rigid arm 61. A cup-actuating bell-crank lever 78, which is also pivoted on the flange 65, carries a rotatable cam follower 79 at one end and is pivotally connected at its other end to the rigid cup arm 61. The cam follower 79 of each cup-actuating lever 78 is arranged to ride on an internal camming surface 84 of an adjustable cylindrical cam 85, one of which is mounted in fixed position on each of the side walls 73 and 74 by bolts 86 extending through slots (not shown) in the side walls. The camming surfaces 84 are so designed that the cups of each opposed pair of cups are periodically moved toward each other to engage a peach and are subsequently moved away from each other to discharge the peach at a point above the discharge chute E. In FIG. 3 it will be seen that the shaft 70 is driven by a gear 88 which is adjustably secured thereon by bolts 89 that extend through slots (not shown) in the gear 88 and through a hub 90 keyed to the shaft. The gear 88 is in mesh with a gear 91 that is secured to a shaft 94 which drives the endless chain conveyors 35 and 36 through sprockets 96 and 97, respectively. With this arrangement, the movement of the cups can be coordinated with the movement of the impaling blades 37 so that the cups of each pair of cups will move inwardly toward each other at a predetermined time to grasp a peach being advanced on a particular impaling blade 37.

The peach is gripped between the opposed cups 60 and is moved toward the rear of the machine where it is removed from the impaling blade 37 and is carried over a curved flesh-separating blade 99 (FIG. 2) and over an upwardly curved flesh-separating portion 100 of the elongated blade 55. As the cups 60 continue to move, they cause the peach to pass over the rotatable saw blade C which is mounted in the vertical plane of the blades 37 and 55 and is keyed to a shaft 101 that is journalled in a bearing 102 supported from the rear wall 103 of the machine. The saw shaft 101 is driven from a main motor 105 (FIG. 2) through a belt and pulley arrangement 106 (FIG. 1) that is connected between the motor shaft 107 and the saw shaft 101.

Figure 6:
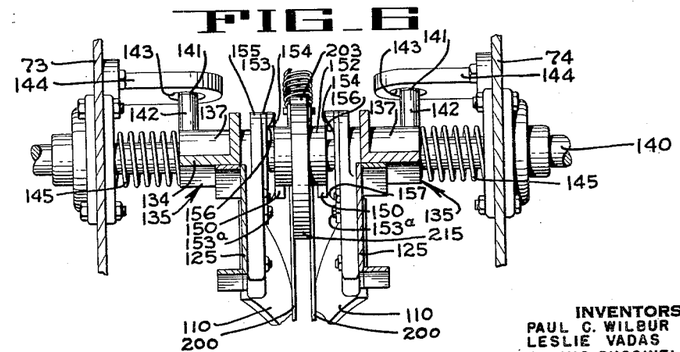
FIGURE 6 is a fragmentary section taken along line 6—6 of FIG. 4.

Immediately following the severing of the flesh and the pit of the peach into halves, each half of the peach passes onto the outer surface of one of two guide plates 110 (FIGS. 2 and 6), which lie closely adjacent the sides of the saw blades C and diverge away from the blade to separate the peach halves as the halves are moved upwardly along the plates. Each peach half is thus supported between a cup 60 and the surfaces of one of the guide plates 110 and is moved over this surface toward a position alongside the pitting head D.

Figures 4, 5:
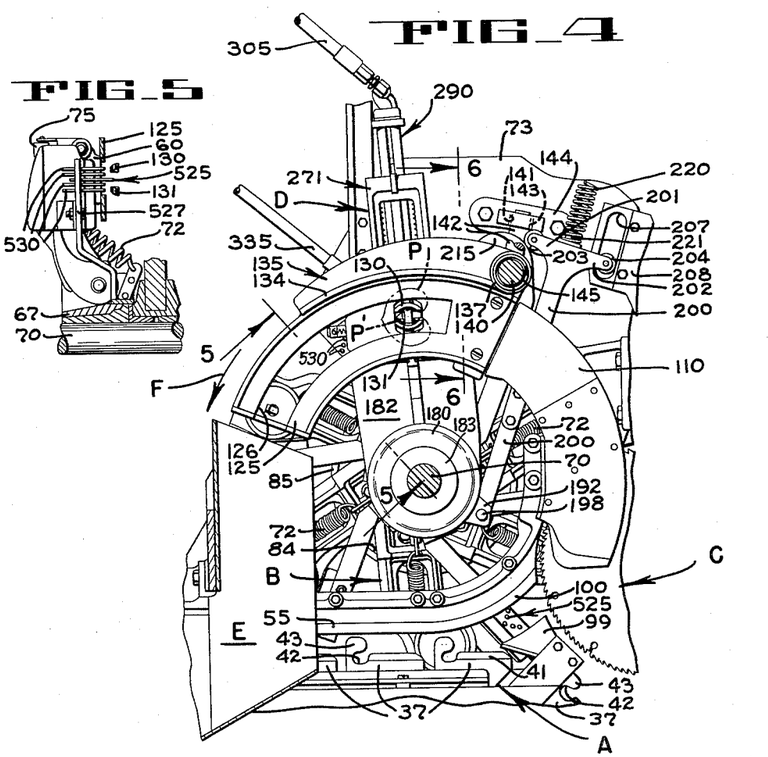
FIGURE 4 is a fragmentary vertical section taken along line 4—4 of FIG. 3, the fruit positioning cup unit and its hub being omitted to disclose adjacent mechanism.
FIGURE 5 is a fragmentary section taken along line 5—5 of FIG. 4.

As seen in FIG. 4, when each peach half P reaches the upper end of the guide plate 110 along which it is being moved, it is pushed off the guide plate 110 and onto a support member in the form of a face plate 125 which has an arcuate opening or slot 126 therein. As it moves onto the support plate 125, the peach half P is so oriented that it straddles the opening 126, and the longitudinal centerline of the pit half P' is disposed normal to a radius projected from the axis of the shaft 70. Further, it is to be noted that the slot is wider than the transverse dimension of a peach pit so that the pit half and a portion of the flesh around the pit half may be disposed opposite the slot. The pitting head D is disposed between two face plates, as seen in FIG. 3. Since the head cooperates with both face plates in exactly the same manner, it will be described in association with only one of the face plates. The head is disposed alongside the face plate 125 and has two movable pit gripping and clamping jaws or members 130 and 131 (FIG. 4) opposite the opening 126 but spaced laterally therefrom at the time the peach is positioned over the opening 126. The jaws have sharpened edges adapted to cut into and through the flesh of the peach half as they move toward gripping engagement with the pit.

As will be explained in detail presently, the peach half is pitted while the head D and the peach half are moving forwardly and downwardly in the direction indicated by arrow F in FIG. 4. During this forward movement, each face plate 125 is moved laterally toward the head D to cause one of the two sets of pit gripping elements 130 and 131 to enter the arcuate opening 126 and engage the flesh of the peach half above and below the pit half. As the gripper elements engage the peach, they are moved toward each other to a closed position to cut through the flesh of the peach and grip the pit half. Thereafter, the gripping elements are rotated as a unit, substantially about the long axis of the pit half, to swing or flip the pit half from the cavity of the peach half.

Each peach face plate 125 is bolted to a ledge 134 of a mounting bracket 135 (FIG. 4) that has a hub 137 slidably supported on a shaft 140 which is journalled for rotation in the side walls of the machine. To prevent rotation of the bracket 135, a roller 141 (FIG. 6) which is rotatably mounted on an upstanding arm 142 of hub 137, is disposed in a short slot 143 in a bracket 144 fixed to the frame of the machine. Each face plate 125 is urged inwardly of the machine toward the head D by means of a spring 145 disposed between the hub 137 of the bracket 135 and the inner surface of the adjacent side walls 73 and 74 of the machine. The face plates 125 are periodically slid outwardly along the shaft 140 toward the adjacent side walls by two short arms 150 which act as cams and are integrally formed in spaced relation on a hub 152 keyed to shaft 140. A plate 153, having a cam follower surface 154, is adjustably secured by capscrews 153a to an arm 155 formed on the hub 137 of each mounting bracket 135. The capscrews 153a extend through slots (not shown) in the plate 153 so that the follower surface can be shifted relative to the arm 155. Each follower surface has an inclined portion 156 and a sharp drop-off portion 157. Each time the shaft 140 is rotated, the two cams 150 ride up the inclined portions 156 and slide the brackets 135 and the face plates 125 outwardly against the resistance of the compression springs 145. When the cams 150 pass over the drop-off portions 157, the springs 145 quickly move the face plates 125 inwardly toward the pitting head D, causing the pit gripping elements 130 and 131 to pass through the slots 126 and engage the peach halves.

Figures 7, 8:
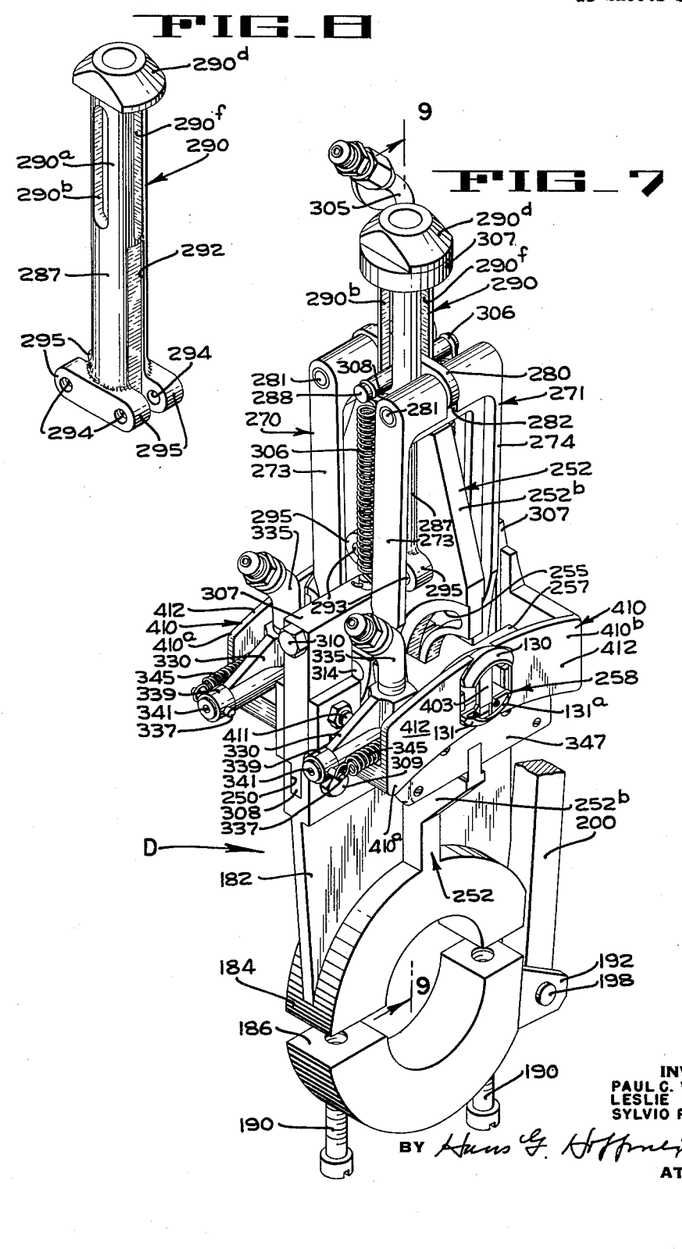
FIGURE 7 is a perspective of the pitting head used in the fruit processing machine of FIG. 1.
FIGURE 8 is a perspective of a cylinder used in the head of FIG. 7.

The pitting head D is mounted for pivoting movement at its lower end in a hub 180 (FIG. 3) that is rotatably mounted by means of bearings 183 on the shaft 70 and has an annular groove 181 formed therein. As seen in FIG. 7, the head D has a central body or support member 182 having a semi-cylindrical bearing member 184 at its lower end, which is adapted to fit in the annular groove 181 of the hub 180. A separate semi-cylindrical bearing member 186 is also adapted to be disposed in the groove 181 and is arranged to be secured to the bearing member 184 by capscrews 190. The bearing member 186 has two apertured ears 192 (one only being shown) between which the lower end of an actuating rod 200 (FIG. 2) is pivotally connected by a pin 198.

The rod 200 (FIG. 2) has an upper end with oppositely projecting bifurcated arms 201 and 202 which carry rotatable rollers 203 and 204, respectively. The roller 204 is disposed in a guide slot 207 formed in a bracket 208 that is secured in fixed position on the frame member 103. A cam 215, keyed to the shaft 140, engages the roller 203 and is arranged to raise the rod 200, as a portion 215a of the camming surface contacts the roller. When the roller 203 rides along a portion 215b of the camming surface, the rod 200 is forced downwardly by a spring 220, that is disposed over a guide rod 221 projecting upwardly from the rod 200, and over a guide rod 222 projecting downwardly from a transverse frame member 223. Referring to FIG. 2, it will be evident that upward and downward movement of the rod 200 will cause oscillating movement of the head D about the axis of the shaft 70.

The pitting head D comprises the previously mentioned central body portion 182 (FIG. 9) which has a groove 250 formed in its upper edge. An upstanding guide plate 252 is integrally formed on the body portion 182 and is disposed at right angles thereto to provide two wings 252a and 252b. Each wing has an arcuate slot 255 that is formed on an arc of a circle about a point indicated by reference letter G. The slot 255 is adapted to receive two rollers 256 for guided movement therein. Each pair of rollers 256 is mounted for rotation in a jaw mounting member or block 257 of a pit gripping unit 258, which will be described presently. When the rollers 256 are moved from the lower portion of slot 255, shown in FIG. 9, to the upper portion of the slot, the associated pit gripping unit 258 is pivoted about an axis indicated by the reference letter "G."

Two actuator links 270 and 271 (FIG. 7), of inverted U-shape, straddle the upper end of the guide plate 252. Each link has two parallel depending legs 273 and 274, and each leg is pivotally connected at its lower end by a pin 275 (FIG. 10) to the block 257 of one of the pitting units. At its upper end, each actuator link is pivotally connected to a crosshead plate 280 by means of a rod 281 which extends through the link and through an end portion of the crosshead plate 280 that is disposed in a vertical groove 282 (FIG. 7) in the link. The crosshead plate 280 also extends through a slot 285 (FIG. 10) in a piston 286 to which the crosshead plate 280 is secured by a pin 288. The piston 286 is mounted for sliding movement in a cylinder 287 (FIG. 8) that is formed on the lower end of a guide cage 290. The cage 290 has an upper tubular portion 290a which has diametrically opposed vertical guide slots 290b and 290c receiving the crosshead pin 288 and opposed slots 290e and 290f receiving the crosshead plate 280. A cap 290d is formed on the upper end of the tubular portion 290a. The cylinder 287 has, on its outer surface, two diametrically opposed recesses 291 and 292 (FIG. 10) which receive the inner edges of the wings 252a and 252b, respectively. The guide cage is mounted in upright position in the head, being secured to the wing portions 252a and 252b by capscrews 293 which project through holes 294 (FIG. 8) in four bosses 295 formed on the cylinder 287 adjacent its lower end. A plug 298 (FIG. 9), which has an annular groove carrying a seal ring 299, is screwed in the tapped lower end of the cylinder 287 to seal a pressure chamber 301 formed thereabove. The piston 286, which has an internal chamber 302, also has an annular groove 303 carrying a seal ring 304. Accordingly, when fluid under pressure is directed from a supply line 305 to the chamber 301, the piston is forced upwardly to carry the two inverted U-shaped links 270 and 271 upwardly, causing each block 257 to be pivoted upwardly about axis "G."

The piston is moved upwardly against the resistance of two springs 306 (FIG. 7), each of which is anchored at its upper end in the piston pin 288 and at its lower end in a fixed block 307. Each block 307 has a lower flange 308 locked in the groove 250 of the body portion 182 by bolts 309. A long bolt 310 extends through the upper end of both fixed blocks 307 and through the guide plate 252 to lock both blocks to the plate. During the upward movement of the piston 286 the springs 306 are tensioned. Accordingly, when the pressure in line 305 is released, the springs 306 move the actuator links 270 and 271 downwardly, causing the pitting unit blocks 257 to be swung downwardly to the position of FIG. 9. A rubber ring 307 cushions the upward movement of the crosshead plate 280 and a rubber ring 308 cushions its downward movement.

Each pitting unit 258 comprises the above-mentioned block 257 which has two spaced flanges 311 and 312 (FIG. 11) defining a groove 313 adapted to receive the slotted portion of the associated wing 252a or 252b. The two rollers 256 (FIG. 9), which are disposed in each slot 255, are mounted on the block 257 by pins 314, each of which has its opposite end portions fixed in the two spaced flanges 311 and 312. Accordingly, when the block is pulled upwardly, the rollers 256 cause the block to follow an arcuate path.

The block 257 has a deep recess 315 (FIG. 11) in one wall and has an elongated tubular passage 316 which has a portion intermediate its ends that opens into the wall recess. The passage 316 forms a power cylinder which receives a piston 321 (FIG. 12) having a central passage 322. Along one side face of the piston 321, a recess 325 is formed to provide two spaced shoulders 326 and 327. The piston 321 is also disposed in a bore 328 of a fitting 330 which has one end abutting an annular flange 331 formed on the piston. A passage 333 in the fitting 330 communicates with the passage 322 of the piston and with a connector 335 which is adapted to be connected to a source of fluid under pressure. A pin 337 (FIG. 11) is arranged to be inserted through aligned holes 338 in a collar 339 and through a hole in an end portion 340 of the piston to lock the collar on the piston and to lock the fitting 330 between the collar and the annular flange 331 of the piston. A setscrew 341 is threaded in the tapped end of the piston to engage and hold the pin 337 in position.

Figures 11, 12, 13:
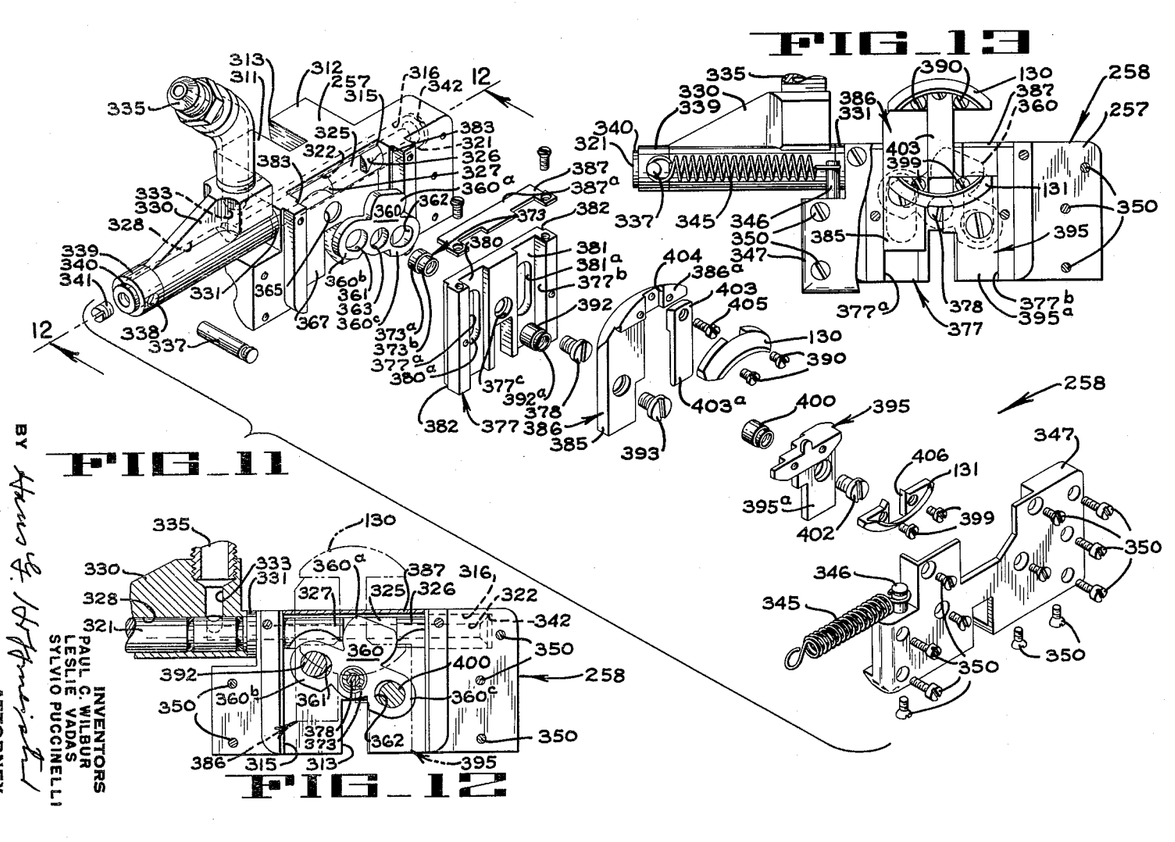
FIGURE 11 is an exploded perspective of a pitting unit shown removed from the pitting head.
FIGURE 12 is a fragmentary section taken along line 12—12 of FIG. 11 through the housing of the pitting unit with a portion of the operating mechanism positioned in the housing.
FIGURE 13 is a side elevation, with parts broken away, of an assembled pitting unit.

In the position of the piston shown in FIGS. 11 and 12, the flange 331 is abutting the end face of the block 257, and a clearance space 342 is formed between the opposite end of the piston and the cylinder wall. It will be apparent that when fluid under pressure is directed through passage 333 into passage 322 of the piston, the fluid will enter the clearance space 342 and exert pressure on the end of the piston, causing it to move to the left, as viewed in FIG. 12. This movement is made against the resistance of a spring 345 (FIG. 13) which is connected between the pin 337 on the collar 339 and a pin 346 on a cover plate 347 (FIG. 11) that is adapted to be secured to the block 257 by capscrews 350. Accordingly, when the fluid pressure acting on the piston is released, the spring 345 returns the piston toward the right to the position shown in FIG. 12.

The pit gripping jaws or clamping elements 130 and 131 are moved relative to each other between opened and closed position, during reciprocating movement of the piston 321, by means of an actuator member 360 (FIG. 12) which is disposed in the wall recess 315 of the block 257 and has three arms 360a, 360b and 360c, the arm 360a being disposed between the shoulders 326 and 327 of the piston. The arms 360b and 360c have elongated cylindrical openings 361 and 362, respectively. The central portion of the member 360 is provided with a cylindrical opening 363 (FIG. 11) which is of the same diameter as a cylindrical recess 365 in a wall 367 of the block 257. The actuator member 360 is pivotally mounted on the block 257 by means of a pivot pin 373 which has a portion 373a adapted to be snugly positioned in the recess 365 of the block and in the opening 363 in the actuator 360. The pivot pin 373 is secured to the rear face of a guide plate 377 by a capscrew 378, which is disposed in an opening 377c in the plate 377 and is threaded into a reduced diameter portion 373b of the pivot pin 373 to lock the pivot pin on the guide plate 377 with two shoulders 382 of the plate 377 abutting shoulders 383 formed on the block 257. With this arrangement, the actuator 360 can pivot freely about the axis of pivot pin 372 as the shoulders 326 and 327 of the piston 321 alternately contact the upstanding arm 360a. A top plate 387, which is secured on the upper surface of the guide plate 377, has a marginal portion 387a overlying the uncovered portion of the wall recess 315.

The guide plate 377 has two vertical guide grooves 377a and 377b. Walls 380 and 381, defining the bases of the grooves, have elongated slots 380a and 381a, respectively. The groove 377a is arranged to receive a leg 385 of a slide 386 which has an upper portion 386a to which the upper jaw 130 is secured by screws 390. A guide pin 392, which is arranged to project through the elongated slot 380a and into the opening 361 in the actuator 360, is secured to the slide 386 by a capscrew 393 that is threaded into a tapped end portion 392a of the guide pin 392.

The guide groove 377b in the guide plate 377 is arranged to receive the lower leg portion 395a of a second slide 395 to which the lower jaw 131 is secured by screws 399. A guide pin 400, which is secured to the slide 395 by a capscrew 402, projects through the elongated slot 381a of the guide plate 377 and into the opening 362 in the actuator 360. A flat bar 403, which is secured in a groove 404 of slide 386 by a capscrew 405, has a lower end portion 403a adapted to project into an opening 406 in the jaw 131 to maintain the alignment of the jaws 130 and 131.

Referring to FIG. 12, it will be seen that, when the actuator 360 is pivoted clockwise about pin 373 by the piston 321, the guide pin 373 raises the slide 386 while the guide pin 400 lowers the slide 395. This operation moves the jaws 130 and 131 to open position. When the actuator 360 is pivoted counterclockwise, the slides 386 and 395 are moved in opposite directions to bring the jaws to closed position.

Figure 9:
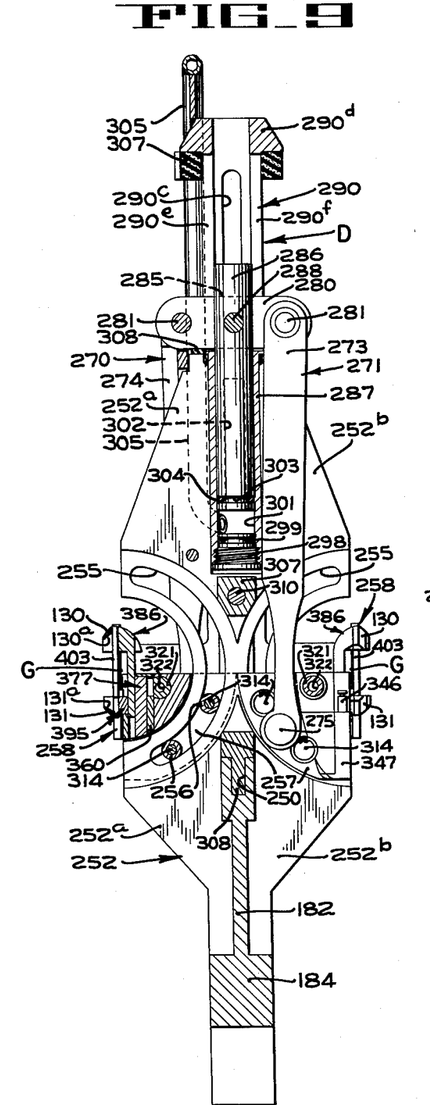
FIGURE 9 is an enlarged vertical section taken along line 9—9 of FIG. 7, one pitting unit and its actuating link being shown in elevation.
Figure 10:
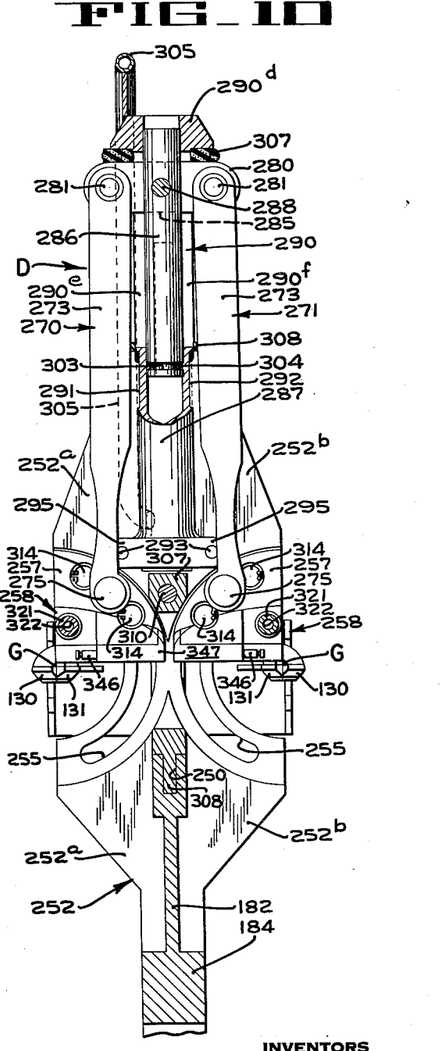
FIGURE 10 is a section similar to FIG. 9 but showing two pitting units and their actuating links in elevation.

In FIGS. 7 and 9 it will be noted that the jaws 130 and 131 have slanted outer wall portions 130a and 131a. When the jaws are disposed in gripping engagement with a pit half, these wall portions are disposed substantially the same distance from the center of rotation "G" of the jaws as is the outer surface of the pit half. Accordingly, during flipping of the pit half the wall portions 130a and 131a move along the same arc as the outer surface of the pit and do not cut into or gouge out any of the flesh surrounding the pit cavity.

A bracket 410 (FIG. 7), having two members 410a and 410b, is secured by a plurality of stud bolts 411 (only one being shown) to each side of the support block 307 of the head. Each bracket 410 has a vertical plate portion 412 that is adapted to project through the slot 126 of the associated face plate 125 to cooperate with the face plate to support the peach half as it is pressed inwardly by the feed cup 60.

Figure 1:
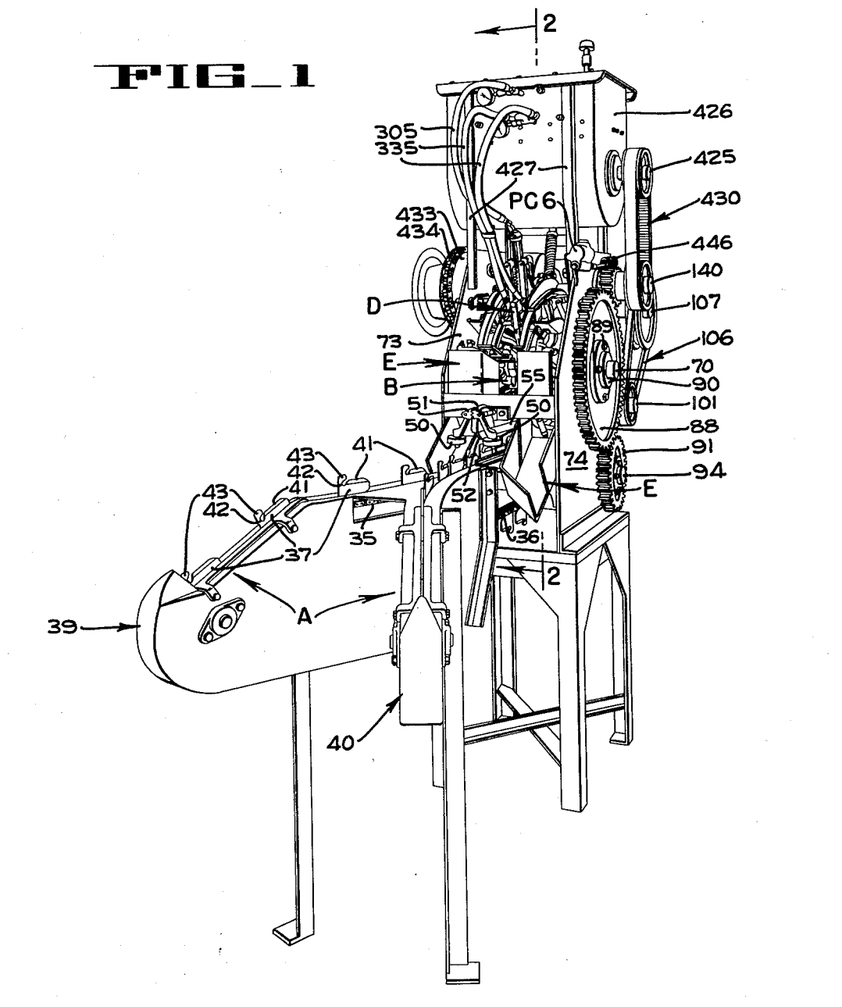
FIGURE 1 is a perspective of the fruit preparation machine of the present invention.
Figure 14:
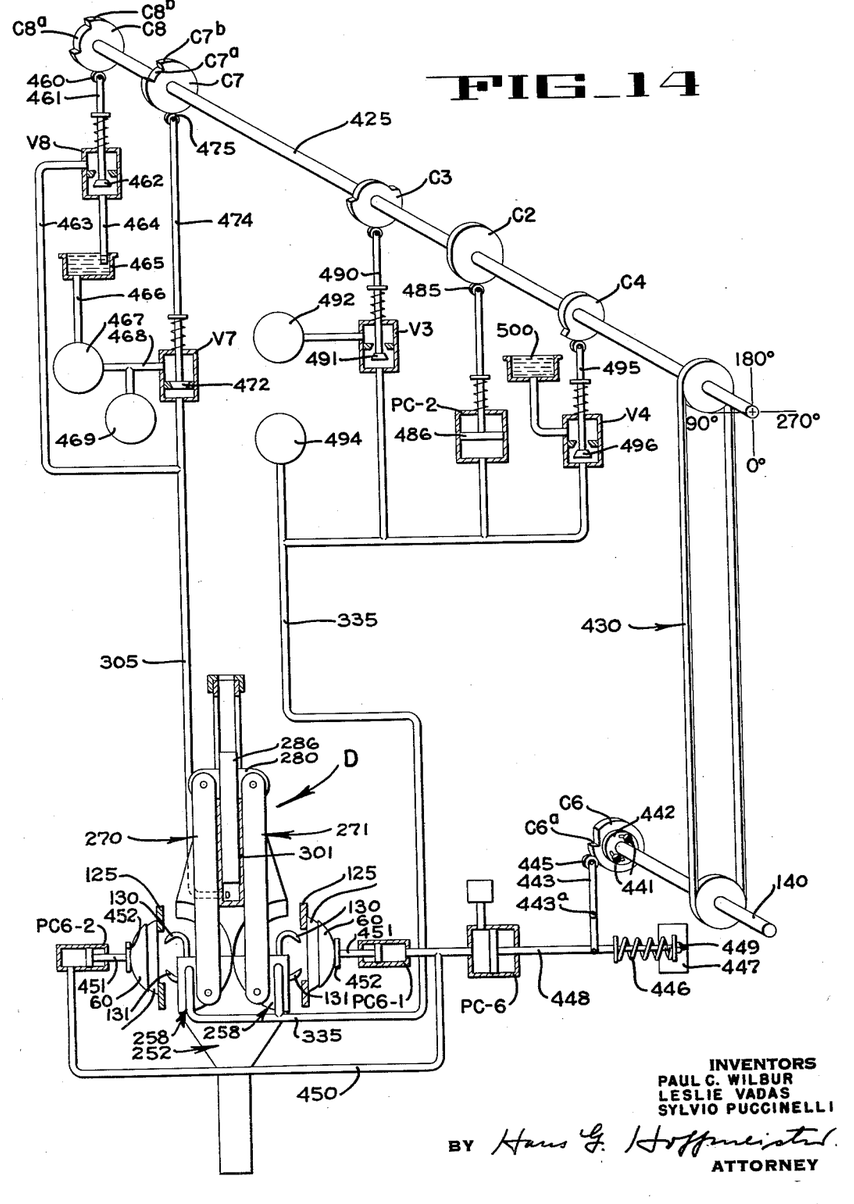
FIGURE 14 is a diagrammatic showing of the cam-controlled hydraulic system associated with the pitting head of the present invention.

The movements of the various pit gripping and flipping mechanisms are controlled by a cam operated hydraulic system schematically shown in FIGURE 14. In this system several of the cams of the system are keyed to a camshaft 425 which, as seen in FIG. 1, is journalled for rotation in the walls of a fluid supply tank 426 mounted in fixed position above the machine proper by a plurality of rigid bars 427. A timing belt and pulley drive mechanism 430 connects the cam shaft 425 in driven relation to one end of the previously mentioned cam shaft 140 which carries the cam 215 (FIG. 2) that controls the oscillating movement of the pitting head D. At its opposite end, the cam shaft 140 carries a sprocket 433 (FIG. 3) which is connected by a chain 434 to a sprocket 435 on an idler shaft 436. A sprocket 437, that is keyed to the idler shaft 436, is driven from the motor shaft 107 by a chain 439. With this arrangement, the two cam shafts 425 and 140 are driven at the same rotary speed and in timed relation with the other mechanisms that are driven by the motor 105.

The cam shaft 140 has a cam C6 (FIG. 14) adjustably secured by setscrews 441 to a disc 442 keyed to the shaft. A lever 443, which is pivotally mounted by a pin 443a on the machine side plate 74, carries a roller follower 445 which rides along the camming surface of cam C6. When the follower 445 drops into a recessed portion C6a of the cam C6, a spring 446, which is mounted on a flange of a plate 447 secured to the side plate 74, quickly shifts a pushrod 448 in a direction to apply pressure through a main power cylinder PC6 to line 450 leading to two power cylinders PC6–1 and PC6–2 (FIG. 3). The pressure exerted in line 450 is dependent on the setting of the spring 446 and this setting may be varied by a nut 449. Each power cylinder has a push rod 451 connected to a plate 452 pivotally mounted on the inner surface of the adjacent side plate 73 or 74. When pressurized fluid is directed to the cylinders PC6–1 and PC6–2, the plates 452 are urged inwardly to contact and apply pressure to the roller 75 of the cup 60 that is holding a peach half against the face plate 125. As will be explained presently, each plate 452 applies pressure to the associated cup after the clamp jaws have begun their closing movement and have engaged or "found" the pit. Thus the plate 452 applies an auxiliary pressure which causes the jaws to be embedded deeper in the peach half.

The cam shaft 425 (FIG. 14) has five cams C8, C7, C3, C2 and C4 keyed thereon. The cams C8, C7, C3 and C4 are associated with valves V8, V7, V3 and V4, respectively, while cam C2 is associated with a master power cylinder PC–2. The cams, valves, power cylinder, the springs which resist the cam-actuated movements of the valves and piston rods, and the valve actuating mechanisms are shown schematically in FIG. 14. However, it will be understood that any necessary conventional valves and valve operating mechanisms may be used and that the camming surfaces of the cams are designed to carry out the coordinated operations to be described presently. Each of the cams may be made adjustable relative to the shaft on which it is carried in the manner explained in connection with cam C6. The cams C8 and C7 control the flow of pressurized fluid to line 305 which communicates with the cylinder 301 which controls the simultaneous pivoting or flipping movement of the units 258. Cam C8 has a camming surface arranged to engage a follower roller 460 mounted on a push rod 461 which is operatively connected to a valve element 462 of the valve V8. When the valve element 462 is in the illustrated position shown in FIG. 14, fluid may flow from a conduit 463 through the valve housing and into a conduit 464 leading to a reservoir 465. A conduit 466 connects the reservoir 465 to the suction side of a pressure unit 467 having a pump which is arranged to pump fluid through a conduit 468 to the housing of the valve V7. An accumulator 469 communicates with conduit 468. A valve element 472 of valve V7 is operatively connected to a push rod 474 which carries a roller follower 475 that rides on the camming surface of cam C7. At 107° of camshaft rotation, the follower 475 rides along a portion C7a of the camming surface causing the valve element 472 to be raised from the illustrated position, and causing fluid to be forced through the housing of valve V7 into the conduit 305. At 162° the follower 475 rides up a surface C7b to close the valve again. Similarly, at 77° of camshaft rotation, a camming surface C8a causes closing of valve V8 and at 167° a camming surface C8b causes opening of the valve V8. Thus, the cams C8 and C7 are so arranged that, while valve V8 is closed, cam C7 opens valve V7 permitting pressurized fluid to be forced through conduit 305 into the cylinder 301 causing the pitting units 258 to be pivoted upwardly. When the units reach their uppermost position, the valve V7 is closed and valve V8 is opened, permitting the downward, spring-urged movement of the pitting units to pump the fluid in a reverse direction through conduit 305, conduit 463, and valve V8 to reservoir 465.

The camming surface of cam C2 engages a roller follower 485 which is connected to a piston 486 of the master cylinder PC–2. As the cam C2 is rotated counterclockwise (FIG. 14) from the illustrated position, the piston is started downwardly at approximately 37° of camshaft rotation, causing pressure to be applied to line 335 which directs fluid to the passage 316 to move the piston 321 and actuate the pivoting actuator 360 (FIG. 12) to move the jaws 130 and 131 toward closed position. From 92° to 102° of camshaft rotation, the piston dwells. From 102° to 162° the piston is again moved downwardly to apply clamping pressure to the jaws, and then the piston again dwells in its lower position from 162° to 237°, holding the jaws in locked position. Then from 237° to 297°, the piston is moved upwardly, and from 297° to 360° the piston is held in its upper position.

Cam C4 on camshaft 425 actuates a push rod 495 which has a valve element 496 of valve V4 connected to its lower end. When the valve element 496 is in the open position, fluid from a reservoir 500 is permitted to flow into the line 335 which supplies fluid to the clamping jaws. The valve V4 is closed at approximately 27° of camshaft rotation and held closed during the clamping operation. When the clamping operation is completed, the valve V4 is opened at approximately 237° to permit the reservoir 500 to refill the line if any fluid has been lost during the operation.

Cam C3 actuates a push rod 490 which carries a valve element 491 of valve V3. A low pressure accumulator 492 communicates with the valve housing and, when the valve V3 is open, the low pressure accumulator 492 controls the pressure in line 335 which directs fluid to the clamping jaws. With this arrangement, the valve V3 is held open from 0° to 92° of camshaft rotation and, during this interval, the cam C2 causes pressure to be applied to the jaws at the low pressure dictated by the low pressure accumulator 492. At 92°, the valve V3 is closed and held closed until approximately 237°.

A high pressure accumulator 494 communicates with line 335. Accordingly, after the low pressure clamping period is completed and valve V3 is closed, the second clamping movement effected by cam C2 is carried out at a high pressure dictated by accumulator 494.

A complete pitting cycle will be described with reference to FIGS. 14 throgh 20. It will be understood that the zero degree position indicated on the camshaft 425 of FIG. 14 corresponds to the zero degree position indicated on operational chart FIG. 15. Further this zero position corresponds also to the operational position of FIG. 16 where two peach halves P have been separated and have just been transferred by cups 60 from the guide plates 110 (FIG. 2) to the slotted face plates 125 and the cam 215 is ready to start the forward movement of the head D.

At 27° (FIG. 15) the refill valve V4 closes. At this point the head D has caught up with and is moving in unison with the peach halves. Also at 27° the cams 150 (FIG. 6) release the face plates 125 and permit the springs 145 to move the plates inwardly carrying the peach halves into contact with the open jaws of the clamping units and permitting the peach to be sunk into jaws under the pressure exerted by the springs 72 connected to each cup support arm. At 37° the clamping jaws are moved under low pressure toward closed position against the pit. Thus from 37° to 92°, the face plates are moved inwardly and the peach halves are urged onto the clamping jaws by the springs 72 while the jaws are being moved toward their closed position under the low pressure dictated by accumulator 492.

Figure 17:
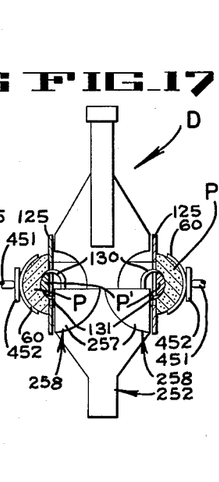

At 92° the cam C6 (FIG. 14) releases the push rod 447 which then quickly applies pressure to power cylinders PC6–1 and PC6–2. This auxiliary sink pressure is applied through the pivoting plates 452 to urge the cups inwardly to sink the jaws further in the peach halves and assure that each pit half is substantially enclosed by the clamping jaws. At 102°, valve V3 is closed and the high pressure accumulator 494 takes over so that the ensuing clamping movement of the jaws from 102° to 162° is done at high pressure. FIG. 17 illustrates the position of the peach halves and the pit halves during the sinking and clamping operation.

The camming surface of the cam C2 is so designed that, if no pit half is between the jaws, the jaws come into abutting relation with each other just before the piston in the master power cylinder PC–2 completes its pressure stroke. Accordingly, when a pit half is between the jaws and the jaws grip the pit half before they are fully closed and the piston in the master cylinder still has a short distance to travel. The jaws are locked on the pit by continued application of pressure. At 162° the downward movement of the piston is stopped, and from 162° to 237° the cam C2 holds the piston in fixed position, further locking the jaws. In summary, the jaws are first closed under low pressure, then the auxiliary sink pressure is applied, and finally the jaws are clamped against the pit half under high pressure.

Figure 18:
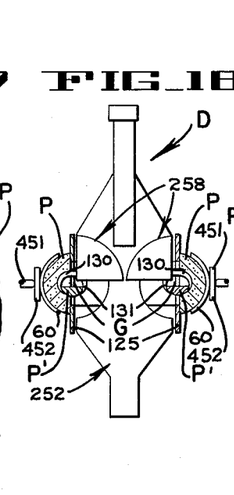
Figure 19:
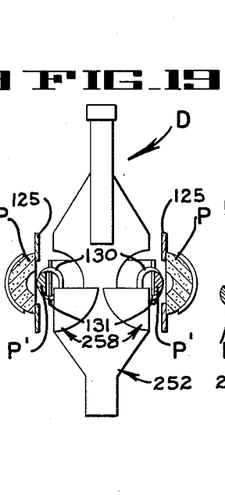

While the high pressure clamping operation is going on, the cam C7 opens valve V7, permitting high pressure fluid to be directed to the flipping mechanism of head D to swing each pitting unit upwardly, whereby the jaws are swung downwardly, as seen in FIG. 18, tearing away from the peach half the portion of the pit that was not cut away from the peach half by the closing of the jaws. It will be noted that the axis G about which the jaws rotate is substantially in the suture plane of the peach, being displaced from that plane about ⅛ of an inch. When the jaws reach the lower position of FIG. 18, valve V7 is closed and valve V8 is opened permitting the springs 306 to swing the pitting units downwardly to their initial position. Downward movement of the pitting units causes the piston 286 to pump fluid rearwardly through lines 305 and 463 and valve V8 into reservoir 465. The pitting units are thus returned to the position shown in FIG. 19.

Figure 20:
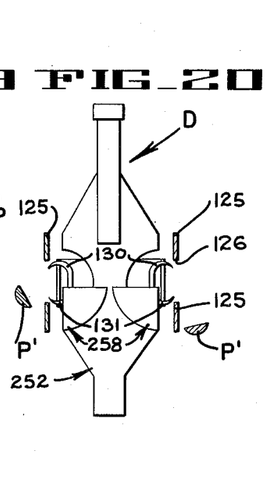

During the return movement of each pitting unit, the cams 150 (FIG. 6) force the face plates 125 outwardly, moving each peach half away from its pit half. When the face plates are moving toward their outermost positions, and approximately at 237° of camshaft rotation, the cam C2 allows the piston of the power cylinder PC–2 to move upwardly, releasing the pressure in line 335 to the clamping jaws. The springs 345 of the pitting units then immediately move the jaws to open position, causing the pit half to be rejected, as seen in FIG. 20.

Figure 15:
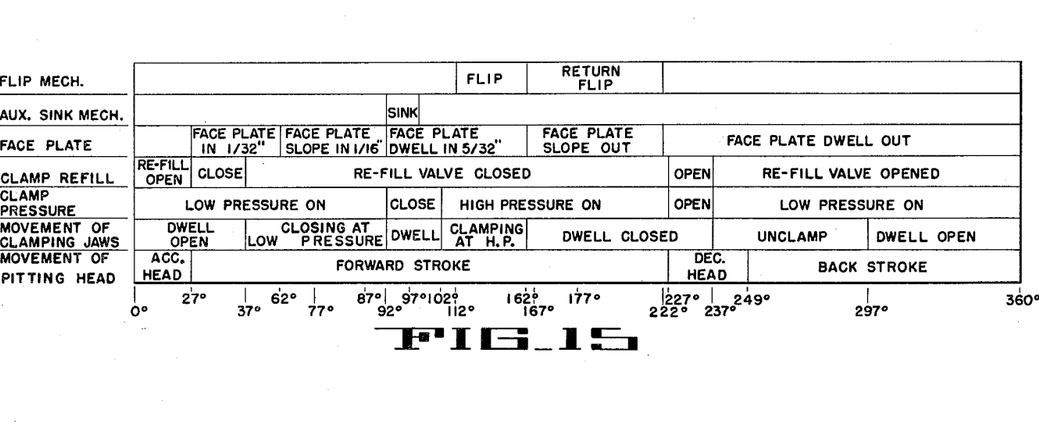
FIGURE 15 is a chart disclosing a sequence of operations in one pitting operation of the pitting head of the present invention.
Figure 16:
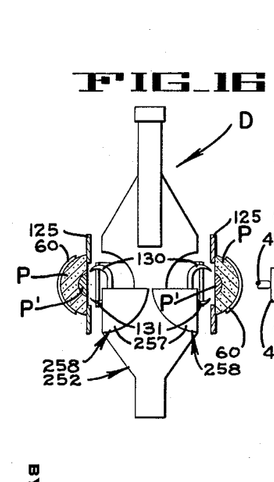
FIGURES 16 through 20 are diagrammatic operational views showing successive positions of the mechanisms in the pitting head during one pitting operation.

As may be seen in FIG. 15, at the end of each pitting cycle, the face plates 125 are in their outer position, the refill valve V4 is open permitting line 335 to be replenished if necessary, the clamping jaws are in their open position, and the head D has been returned to its rearmost position in the machine.

While a particular sequence of operations of the control circuit has been described, it will be evident that this sequence may be changed somewhat by changing the settings of the various adjustable cams.

Just before the head D is moved rearwardly to its initial position, the cups 60 are moved outwardly by the cylindrical cams 85 (FIG. 3) and the peach halves drop out of the cups into the discharge chute E (FIG. 1). If a peach half should adhere to the face plate 125, it is removed during the next forward movement of the head by one of a plurality of raking mechanisms 525 (FIG. 5), one of which is disposed between each pair of adjacent feed cups 60. In the arrangement shown in FIG. 3 there are six cups 60 on each side of the head D. Accordingly, there will be twelve raking mechanisms 525 used in the machine. Each raking mechanism comprises a curved bar 527 (FIG. 5) that is bolted to the tubular support member 67 carrying the cup mounting flanges 65. At its outer end, the bar 527 carries a plurality of pins 530 which are disposed adjacent the face plate 125 substantially at the same distance from the axis of tubular support member 67 as the cups 60. Accordingly, if a peach half in a particular cup adheres to the face plate 125, the forwardly moving pins 530 behind that cup will engage the peach half and remove it from the face plate, causing it to drop in the discharge chute. Similarly, if a pit half should cling to one of the clamping jaws 130 or 131, the pins will engage the pit half as the jaws move rearwardly with the head D past the pins.

Figure 21:
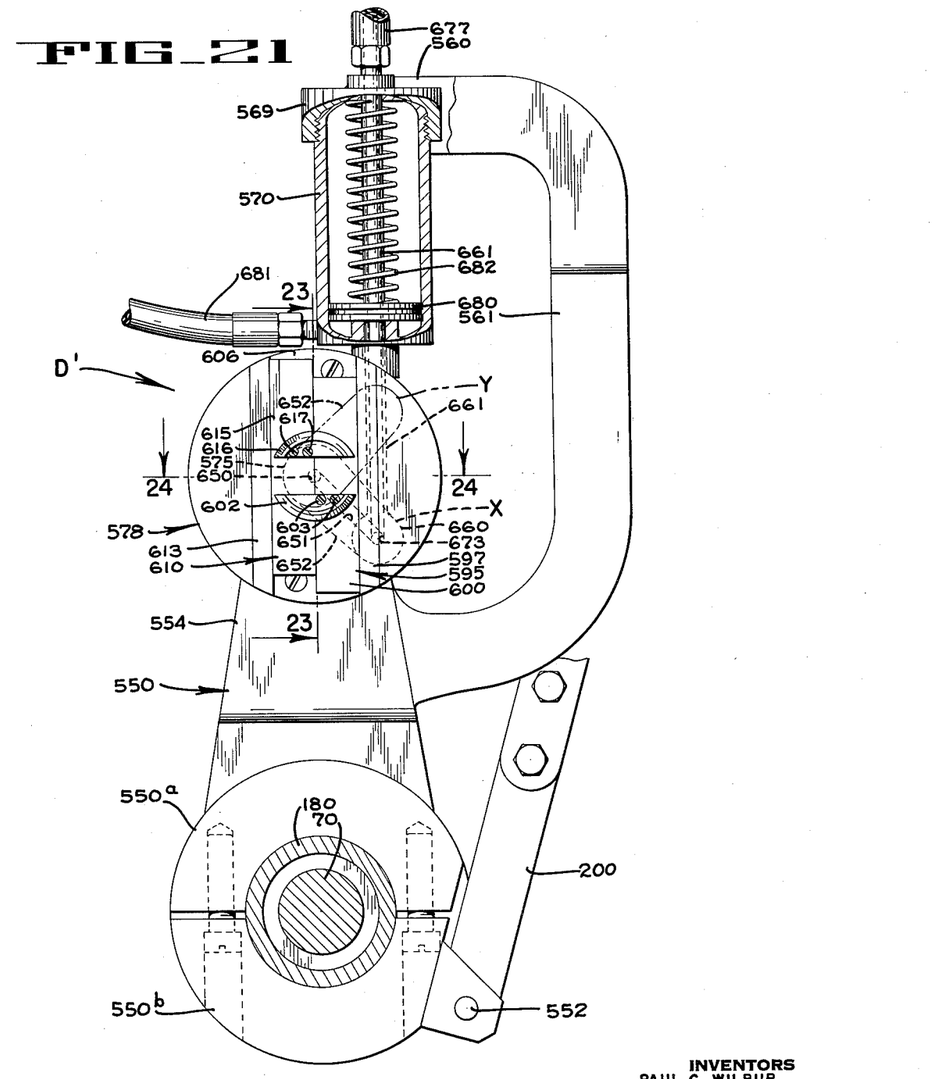
FIGURE 21 is an enlarged side elevation, with parts broken away, of a second embodiment of the pitting head of the present invention.
Figures 22, 25:
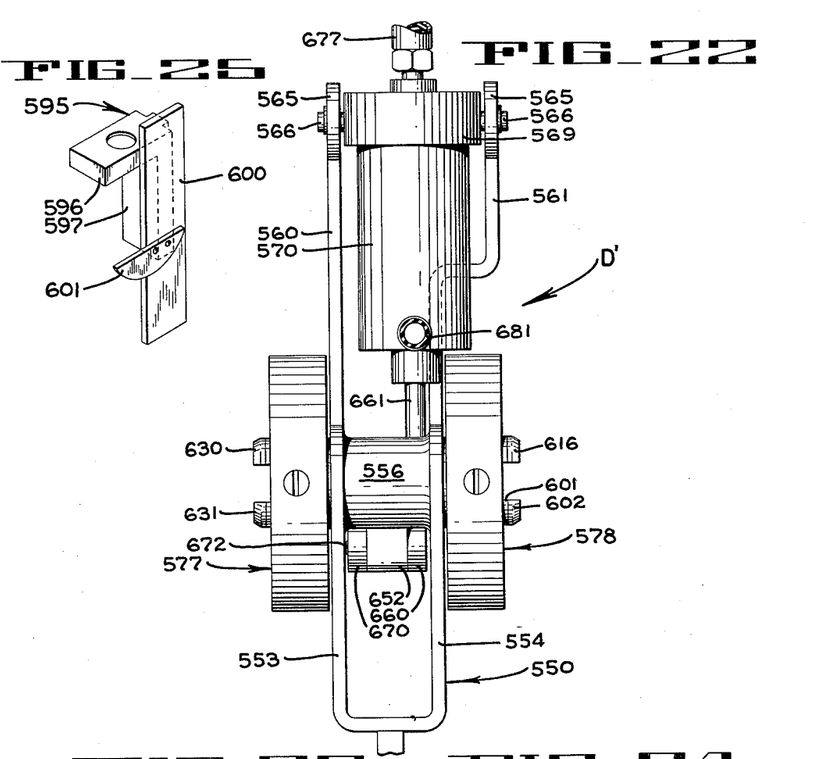
FIGURE 22 is a fragmentary front elevation of the pitting head of FIG. 21.
FIGURE 25 is a perspective of a slide member used in the head of FIG. 21.

In FIGURES 21 and 22 a second embodiment D' of the pitting head of the present invention is illustrated. In the previously described head D the pit gripping jaws are arranged to move into gripping engagement with a pit half and then rotate as a unit downwardly, substantially about an axis disposed in the suture plane of the peach, to flip the pit downwardly. In the second head D' the jaws grip the pit half and then rotate the pit half about an axis substantially normal to the suture plane to twist the pit half loose from the peach half.

The pitting head D' comprises a lower body portion 550 (FIG. 21) having two bearing members 550a and 550b adapted to be clamped together and rotatably mounted on hub 180 that is journalled on shaft 70. The actuator rod 200 is pivotally connected to the member 550b by a pin 552 so that upward movement of the rod 200 causes forward pivoting movement of the head D'.

Above the bearing portion 550a, the body portion 550 branches out to provide two generally vertical support plates 553 and 554 (FIG. 22) which have a tubular bearing member 556 integrally formed at one end thereof. Two arms or support brackets 560 and 561 (FIG. 21) are integrally formed on the rear surface of plates 553 and 554 respectively. At its upper end, each of the brackets 560 and 561 has a bushing 565 (FIG. 22) which rotatably journals a pin 566 projecting from a cap 569 of a power cylinder 570.

Figure 23:
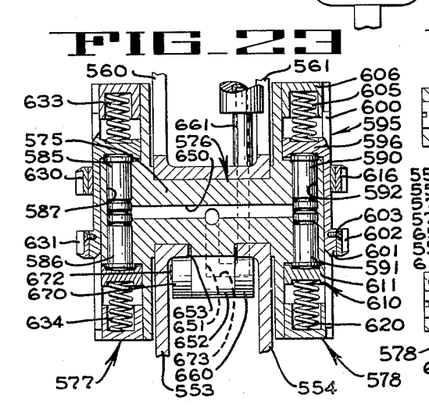
FIGURE 23 is a section taken along lines 23—23 of FIG. 21.
Figure 24:
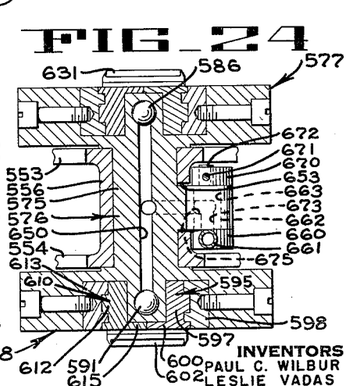
FIGURE 24 is a section taken along lines 24—24 of FIG. 21.

The tubular bearing 556 is arranged to rotatably journal a central cylindrical body portion 575 (FIG. 23) of a spool-like clamp carrier 576 which includes two cylindrical end members 577 and 578, one member being integrally formed at each end of the central portion 575. Two opposed pistons 585 and 586 (FIG. 23) are slidably disposed in a bore 587 in end member 577, and two opposed pistons 590 and 591 are slidably disposed in a bore 592 in end member 578. Piston 590 bears against a lateral flange 596 of a slide 595 (FIG. 25) which has a rear wall 597 disposed in sliding, tongue-in-groove engagement with a fixed member 598 (FIG. 24) of the end member 578. The slide 595 has a front flat face 600 (FIG. 25) having a boss 601 to which a lower clamping jaw 602 is secured by screws 603. When the piston 590 is moved away from piston 591, the jaw 602 is moved radially inwardly of the cylindrical end member 578 against the resistance of a compression spring 605 (FIG. 23) disposed between the flange 596 and a socket 606 secured in the end member 578.

The piston 591 bears against a slidable plate 610 which is similar to slide plate 595 in that it comprises a lateral flange 611 (FIG. 23) against which the piston presses, a rear wall 612 (FIG. 24) in tongue-in-groove sliding engagement with a fixed member 613 of the end member 578, and a front wall 615 (FIG. 21) to which an upper clamping jaw 616 is secured by screws 617. A compression spring 620 (FIG. 23) resists the radially inward movement of jaw 616 under the urging of piston 591.

An upper jaw 630 (FIG. 23) and a lower jaw 631 are mounted in end member 577 in exactly the same manner as jaws 602 and 616 are mounted in end member 578, and the pistons 585 and 586 are arranged to actuate the slides, on which the jaws are mounted, against the resistance of two compression springs 633 and 634.

Pressurized fluid is directed to the spaces formed between the rounded ends of the aligned pistons 590 and 591 and between the aligned pistons 585 and 586 by means of a passage 650 (FIG. 24) formed in the central portion 575 of the clamp carrier 576. The passage 650 communicates with a passage 651 in a crank arm 652 which is integrally formed on the central portion 575 and projects through an opening 653 in the tubular member 556. A hub 660, formed on the end of a tube 661, has a lateral cylindrical bearing portion 662 rotatably journalled in an opening 663 in the crank arm 652. A collar 670 is secured by a setscrew 671 to a reduced diameter extension 672 of the bearing portion 662 to retain the bearing portion in the crank arm. The central passage of the tube 661 communicates with an axial passage 673 in the bearing portion 662 and passage 673 in turn is connected to the passage 651 in the crank arm 652 by a radial passage 675 which has an opening at the periphery of the bearing member that is sufficiently wide so that the radial passage 675 will be maintained in flow communication with the passage in the crank arm for all pivoted positions of the crank arm. The fluid supply tube 661 extends centrally through the power cylinder 570 and is connected exteriorly of the cylinder to a tube 677 (FIG. 22) leading to a source of pressurized fluid.

It will be evident that, when fluid is directed into the openings between each pair of aligned pistons, the pistons are moved outwardly away from each other, actuating the slides and moving the clamping jaws toward each other to grip the pit halves. When the pressure in the line is released, the springs move the pistons toward each other to open the jaws.

The crank arm 652 is oscillated between positions X and Y (FIG. 21) by means of a piston 680 that is keyed to the tube 661 inside the power cylinder 570. Pressurized fluid is directed into the cylinder 570 through a conduit 681 which communicates with the inside of the cylinder on one side of the piston. When fluid is directed into the cylinder, the piston is moved upwardly (FIG. 21) to swing the crank arm through approximately 90° against the resistance of a spring 682. This swinging of the crank arm 652 causes a partial rotation of the clamp carrier so that a pit half, gripped between the jaws of the carrier, will be rotated about an axis substantially normal to the suture plane and pulled loose from the flesh of the peach. While the pit is in this rotated position, the pressure in the line 677 leading to the pistons 590, 591, 585 and 586 is released, permitting the springs to move the jaws to open, pit-discharging position. After the pit half has been discharged, the carrier is swung back to the position of FIGURE 21.

It will be understood that the head D' is adapted to be substituted in the machine for the head D and the cam-controlled hydraulic mechanisms described in connection with head D may be used to control and coordinate the movements of the head D' in the machine.

From the foregoing description it will be recognized that the present invention provides a novel method of pitting fruit halves by bodily gripping and positively carrying the pit half out of the pit cavity while holding the peach half against movement with the pit half. The flipping of the pit half about an axis substantially in the suture plane assures the removal of the pit half with a minimum of tearing of the flesh around the cavity. Similarly, the twisting of the pit half about an axis normal to the suture plane provides a positive method of removing each pit half from the flesh of the peach half.

The present cam-controlled hydraulic system which synchronizes the movements of the various members of the pitter makes possible a rapid, efficient pitting operation.

It will be understood that certain modifications may be made to the disclosed embodiments of the invention without departing from the concepts of this invention. Accordingly, the scope of the invention must be determined only by the scope of the appended claims.

Having thus described our invention, what we claim as new and desire to protect by Letters Patent is:

1. In an apparatus for pitting fruit, a pair of pit-gripping jaws mounted for movement toward and away from each other in a common plane, means for positioning a peach half adjacent said jaws with the face of the pit side of the peach half disposed opposite the space between said jaws, means for moving the peach half toward said jaws and the jaws toward each other, means coordinating the movement of said jaws and said peach moving means so that said jaws cut into the flesh of the peach around the pit as they move toward each other in said common plane to contact the pit half, and means mounting said jaws for pivoting movement as a unit about an axis substantially in the plane of the face of the peach half.

2. In an apparatus for pitting fruit, a jaw support member mounted for pivotal movement about a fixed axis, means for oscillating said jaw support member forwardly and rearwardly about said axis, a pair of pit clamping jaws movable between open and closed position and mounted on said jaw support member, a fruit support plate mounted alongside said jaw support member and having an arcuate opening therein disposed opposite said pair of pit clamping jaws and having a configuration corresponding to the curved path of movement of said jaws during oscillation of said jaw support member, means for holding a peach half on said fruit support plate with the pit half alongside said opening, means mounting said fruit support plate for movement toward said jaw support member, means for moving said fruit support plate toward said jaw support member to project said jaws through said opening and into the peach half, means for moving said jaws to closed position, and means coordinating the actuation of said jaw support oscillating means, said plate moving means and said jaw moving means to effect penetration of said jaws into the peach half and closing of said jaws during forward movement of said jaw support member.

3. In an apparatus for pitting fruit, a flat stationary fruit support plate having an opening therethrough, a jaw support member mounted for movement along a predetermined path adjacent one face of said plate, a pair of pit-gripping jaws mounted on said jaw support member for movement from an open spaced apart position to a closed pit gripping position, means for moving a peach half along said fruit support member with the pit side of said half in sliding contact with the face of said plate opposite said one face and with the pit half opposite the opening in said plate, means for moving said jaw support member, and means operable on said peach moving means and said jaw support moving means for coordinating the movements of said two moving means, whereby said jaws are brought into alignment with said pit half and subsequently said jaws and said peach half are advanced in synchronism at the same speed.

4. In a fruit pitting machine, a pitting head mounted for oscillation about a fixed axis, a rod mounted for reciprocating movement and operatively connected to said head to oscillate said head during reciprocation of said rod, a fruit support plate mounted for movement toward and away from said pitting head, spring means urging said plate toward said pitting head, a shaft journalled for rotation adjacent said head, means for rotating said shaft, first cam means operatively connected between said shaft and said rod to effect oscillation of said head during rotation of said shaft, second cam means operatively connected between said shaft and said fruit support plate to effect consecutive movement of said plate away from said head and movement of said plate toward said head under the urging of said spring means during rotation of said shaft, and means for adjusting said first and second cam means to synchronize the oscillation of said head and the movement of said fruit support plate.

5. In an apparatus for pitting fruit, a pair of pit-gripping members mounted for movement from a spaced apart position toward each other to a closed position, means for holding a peach half with the pit side of the half facing said pit-gripping members when said members are in spaced apart position and with the pit half in alignment with the space between said members, means for effecting relative movement between said peach holding means and said pit-gripping members to cause said said members to penetrate into the peach half on opposite sides of the pit half, means for moving said members toward each other as they penetrate said peach half to grip the pit half, and means for pivoting said pit-gripping members as a unit away from said peach holding means to remove the pit half from the peach half.

6. In an apparatus for pitting fruit, a pair of pit clamping jaws, a fruit support plate mounted for movement toward and away from said jaws, means defining an opening in said fruit support plate in alignment with said jaws, spring means urging said fruit support plate toward said jaws, and cam means having a camming surface operable on said fruit support plate for moving said plate away from said jaws against the resistance of said spring and having a portion permitting movement of said plate toward said jaws under the urging of said spring means to project said jaws through the opening in said fruit support plate.

7. In an apparatus for pitting fruit, a rotatable shaft, a pair of pit-gripping jaws projecting in a direction parallel to said shaft, a fruit support plate slidable along said shaft toward and away from said jaws, means defining an opening in said fruit support plate in alignment with said jaws, spring means urging said fruit support plate toward said jaws, a cam carried by said shaft, means defining a follower surface on said plate, means for rotating said shaft to move said cam into engagement with said camming surface for consecutively forcing said plate away from said jaws against the resistance of said spring means and then permitting said spring means to move said plate toward said jaws to project said jaws through the opening in said plate.

8. In a fruit pitting machine, a pitting head comprising an upright support member having a slot formed on an arc of a circle, a jaw mounting member mounted for guided movement in said slot, a pair of jaws mounted for movement toward and away from each other on said jaw mounting member, and means for moving said mounting member along the slot of said support member.

9. In a fruit pitting machine, a pitting head comprising a body member, a pitting unit mounted for movement in an arcuate path on said body member, a fluid-actuated power cylinder mounted on said head and including a piston and a rod operatively connected thereto, linkage means connecting said rod and said pitting unit, and means for supplying fluid under pressure to said power cylinder to actuate said linkage and move said pitting unit along said arcuate path.

10. In a fruit pitting machine, a pitting head comprising a support member having a slot formed on an arc of a circle, a pitting unit mounted for guided movement in an arcuate path in said slot, a power cylinder formed in said support member and including a piston and a rod connected to the piston and projecting outwardly of the cylinder, a cross head pivotally connected to said cross head and to said pitting unit, and means for supplying fluid under pressure to said power cylinder to actuate said piston and move said pitting unit along said arcuate path.

11. In a fruit pitting machine, a pitting head comprising a support member, a jaw mounting member mounted for movement in an arcuate path on said support member, a pair of jaws mounted on said mounting member for movement from an open spaced apart position to a closed pit-gripping position, means defining a cylinder in said mounting member, a piston slidably mounted in said cylinder, means operatively interconnecting said piston and said jaws, and means for directing pressurized fluid into said cylinder on one side of said piston to actuate said piston and move said jaws from open to closed position.

12. In a fruit pitting machine, a pitting head comprising a support member, a jaw mounting member carried by said support member, means defining a cylinder in said mounting member, a piston slidable in said cylinder and having a pair of spaced abutment walls disposed exteriorly of said cylinder, a lever pivotally mounted on said mounting member and having a first arm projecting radially from the pivot point and disposed between the abutment walls of said piston and two side arms projecting radially on opposite sides of the pivot point, each side arm being disposed at right angles to said first arm, a slide mounted for sliding guided movement on said mounting member, means pivotally connecting each slide to one of said side arms, and means for directing pressurized fluid to said cylinder to actuate the piston, pivot said lever and move said slides in opposite directions.

13. In a fruit pitting machine, a pitting head comprising a support member, a jaw mounting member mounted on said support member, means defining a cylinder in said jaw mounting member, a piston slidably mounted in said cylinder and having a pair of spaced abutment members disposed exteriorly of said cylinder, a pair of slides mounted for reciprocating movement on said jaw support member, a jaw mounted on each of said slides, said jaws being disposed in opposed relation and being arranged when moved to a position close to each other to grip a pit disposed therebetween, an actuator lever pivotally mounted on said jaw mounting member and having an arm disposed between said abutment members so that reciprocation of said piston causes pivoting of said lever, and means interconnecting said lever and each of said slides so that pivoting movement of said lever in one direction causes movement of the slides in a direction to move the jaws away from each other and pivoting of said lever in an opposite direction causes movement of said jaws toward pit gripping position.

14. In a pitting machine, a pitting head comprising an elongated support member having a central body portion and two oppositely projecting wing portions, means defining in each wing portion a slot formed on an arc of a circle, said arc subtending an angle of at least 90 degrees, a pitting unit mounted for guided movement in each slot and including a pair of pit gripping jaws movable in a common plane from spaced apart open position to closed pit gripping position, and a power actuated linkage arranged when actuated to simultaneously move both pitting units along said slots and shift the plane of movement of the jaws of each unit through approximately 90 degrees of angular movement.

15. In a pitting machine, a fruit support plate, a fruit carrier having a plurality of spaced fruit positioning members movable along a predetermined path, each positioning member being movable laterally of said path from a position disposed close to said support plate for holding a peach half against said plate to a discharge position spaced from said plate a distance sufficient to permit the peach half to drop between the plate and the positioning member, means at a first portion of the path of movement of said positioning members for moving each member away from said plate to said discharge position, and an ejector member movable along said first portion of the path subsequent to the movement of each positioning member along said first portion of the path for engaging and removing a peach half clinging to said plate after the positioning member has been moved to discharge position.

16. In a pitting machine, a fruit support plate having an opening therein, a pair of jaws mounted in alignment with said opening and arranged for movement from an open spaced apart position to a closed pit gripping position, means for holding a peach half against said support plate with the pit half adjacent said opening and disposed on the opposite side of said plate from said jaws, means for effecting relative movement between said support plate and said jaws in a direction to cause said jaws when in open position to project through the opening in said plate and into the peach half, means for moving said jaws to closed position in gripping engagement with the pit half, means for pivoting said jaws while disposed in said opening to loosen the pit half from the peach half, means for moving said fruit support plate away from said jaws to carry the remainder of the peach half away from the pit half gripped in said jaws, means for moving said jaws to open position, an ejector member movable through the opening between said jaws, and means for moving said ejector member through said opening between the jaws after said fruit support plate has been moved away from said jaws and said jaws have been opened.

17. In a pitting machine, a pair of pit-gripping jaws mounted for movement from an open spaced apart position to a closed pit gripping position, means for holding a peach half in a position with the associated pit half disposed between said jaws, a fluid-operated power cylinder operatively connected to said jaws to move said jaws to closed position, means for delivering fluid to said power cylinder including a conduit in flow communication with said cylinder, means for raising the pressure of the fluid in said conduit to a predetermined pressure level to cause said jaws to move to closed position to contact the pit half, and means for subsequently raising the pressure of the fluid to a higher pressure level to clamp said jaws on the pit half.

18. In a pitting machine, a pitting head comprising a tubular bearing member, a clamp carrier journalled for rotation in the bore of said tubular bearing member, a pair of slides mounted for sliding movement on said clamp carrier, a pair of aligned pistons mounted for reciprocating movement in said carrier, a pit clamp mounted on each slide, means for directing pressurized fluid to said pistons to actuate said slides in a direction to move said clamps toward each other, to grip a pit disposed therebetween, and means for rotating said carrier through a predetermined angular distance in the bore of said tubular bearing member to swing said pit clamps through a corresponding angular distance.

19. In a pitting machine, a pitting head comprising a tubular bearing member, a clamp support member having a central portion journalled for rotation in the bore of said tubular bearing member and a generally cylindrical end member integrally connect to each end of said central portion, a pair of slides mounted for sliding reciprocating movement on each end member, a pit clamp mounted on each slide, a cylinder formed in each end member, a pair of aligned pistons in each cylinder, each piston being operatively connected to actuate one of said slides, means providing a passage in the central portion of said clamp support member in communication with the cylinder in each of said end members, and means for directing fluid under pressure through said passage and into said cylinders to actuate said pistons in a direction to move said clamp elements to closed position.

References Cited in the file of this patent
UNITED STATES PATENTS

| | | |
|---|---|---|
| 242,701 | Scott | June 7, 1881 |
| 2,090,963 | Reese | Aug. 24, 1937 |
| 2,376,526 | Thompson | May 22, 1945 |
| 2,582,636 | Kruse et al. | Jan. 15, 1952 |
| 2,660,208 | Williams et al. | Nov. 24, 1953 |
| 2,664,127 | Perrelli | Dec. 29, 1953 |
| 2,705,036 | Fox | Mar. 29, 1955 |
| 2,730,149 | Aguilar et al. | Jan. 10, 1956 |
| 2,751,948 | Facchini | June 26, 1956 |
| 2,818,098 | Perrelli | Dec. 31, 1957 |
| 2,826,227 | Perrelli et al. | Mar. 11, 1958 |
| 2,880,774 | Perrelli | Apr. 7, 1959 |

UNITED STATES PATENT OFFICE

CERTIFICATE OF CORRECTION

Patent No. 3,045,730                      July 24, 1962

Paul C. Wilbur et al.

It is hereby certified that error appears in the above numbered patent requiring correction and that the said Letters Patent should read as corrected below.

Column 14, line 40, for "cross", second occurrence, read -- rod --; line 41, strike out "head"; same line 41, for "unit" read -- head --.

Signed and sealed this 23rd day of July 1963.

(SEAL)
Attest:

ERNEST W. SWIDER
Attesting Officer

DAVID L. LADD
Commissioner of Patents